United States Patent [19]

Heck et al.

[11] 4,357,263

[45] Nov. 2, 1982

[54] CATALYST FOR THE UPGRADING OF AROMATIC LIQUIDS

[75] Inventors: Roland H. Heck, Pennington; Stephen M. Cleck, Moorestown; Stuart S. Shih, Cherry Hill; Robert C. Wilson, Woodbury, all of N.J.

[73] Assignee: Mobil Oil Corporation, New York, N.Y.

[21] Appl. No.: 216,896

[22] Filed: Dec. 16, 1980

Related U.S. Application Data

[62] Division of Ser. No. 86,876, Oct. 22, 1979, Pat. No. 4,267,033.

[51] Int. Cl.$^3$ .................. B01J 21/04; B01J 23/85; B01J 23/88; B01J 27/04
[52] U.S. Cl. .................................. 252/439; 252/465; 252/470
[58] Field of Search .................. 252/439, 465, 470; 208/216 PP

[56] References Cited

U.S. PATENT DOCUMENTS 3,876,523  4/1975  Rosinski et al. .................. 208/89
4,062,811  12/1977  Hargrove et al. .............. 252/465 X

Primary Examiner—W. J. Shine
Attorney, Agent, or Firm—Charles A. Huggett; Michael G. Gilman; Dennis P. Santini

[57] ABSTRACT

Desulfurization, denitrogenation, deoxygenation and CCR reduction of highly aromatic petroleum and coal derived liquids are conducted with hydrogen and with a refractory base catalyst incorporating at least one Group VIA metal and at least one Group VIII metal. The catalyst has a surface area of between about 100 and 300 m$^2$/g and a total pore volume of between about 0.3 and 1.0 cc/g and is further characterized as follows:

| Pore Volume Distribution, Volume % in Pores of | |
|---|---|
| 0–150 Angstroms diameter | 20–40 |
| 150–200 Angstroms diameter | 40–60 |
| 200+ Angstroms diameter | 10–30 |

10 Claims, 5 Drawing Figures

CATALYST FOR THE UPGRADING OF AROMATIC LIQUIDS

This is a division, of application Ser. No. 086,876 filed Oct. 22, 1979 now U.S. Pat. No. 4,267,033.

BACKGROUND OF THE INVENTION

1. Field of the Invention

This invention relates to the upgrading of liquids containing aromatics and more particularly to the catalytic treatment of highly aromatic petroleum and coal derived liquids to effect removal of sulfur, nitrogen and oxygen and to reduce Conradson Carbon Residue (CCR).

2. Description of the Prior Art

The use of hydrotreating (HDT) to upgrade residue hydrocarbon fractions for use as charge stocks for catalytic cracking was well known in the art by the 1960's. Hydrotreating, as used herein, is meant to encompass those processes using hydrogen in the presence of catalysts in order to remove undesirable compounds from hydrocarbons, i.e. to upgrade said hydrocarbons.

By 1960, it was recognized that hydrotreatment of residues could be used for demetalation, desulfurization, CCR reduction and denitrogenation. There was universal recognition at that time in the art that hydrogenation catalysts comprising Group VI (Cr, Mo, W) and Group VIII metals or their oxides or sulfides deposited on porous refractory supports were extremely useful in hydrotreating processes. Preferred catalysts for hydrotreating were considered to be cobalt-molybdate or nickel-cobalt-molybdate supported on alumina. These catalysts are generally referred to as "conventional HDT catalysts."

The pore size distribution of the HDT catalyst is a very important parameter in determination of the activity of the catalyst. Large pore catalysts generally possess greater demetalating activity and smaller pore catalysts generally posses lower demetalating activity, but higher desulfurizing activity. U.S. Pat. No. 3,730,879 teaches an HDT process comprising a multi-layered arrangement of catalyst with different pore distributions. In the first bed there is used a smaller pore catalyst which is more selective for desulfurization; and in the second downstream bed there is used a larger pore catalyst which is more selective for removal of metal contaminants. According to U.S. Pat. No. 3,730,879, the desulfurization catalyst of the first bed has a catalyst characterized by a pore diameter distribution as follows: <25% 0-100 A; >50% 100-200 A; and the remainder 200-600 A. The demetalation catalyst of the second bed has a catalyst characterized by a pore diameter distribution as follows: <20% 0-100 A; <45% 100-200 A; and balance 200-600 A.

The average pore diameter size for HDT catalysts in desulfurization processes is usually 100-200 A. Such average pore diameter size is disclosed in U.S. Pat. Nos. 3,393,148; 3,674,680; 3,764,565; 3,841,995 and 3,882,049.

Processes for the demetalation and desulfurization of residual oil fractions using conventional HDT catalysts with at least 60% of its pore volume in pores of 100 A to 200 A diameter and at least 5% of its pore volume in pores having diameters greater than 500 A are disclosed in U.S. Pat. Nos. 3,876,523 and 4,016,067.

U.S. Pat. No. 3,902,991 discloses a hydrodesulfurization process for residual oil fractions which uses a conventional HDT catalyst characterized by having at least 50% of its total pore volume in pores having a diameter size range of 65 to 150 A. Another hydrodesulfurization process for resids is described in U.S. Pat. No. 3,730,879, wherein one of the catalysts is characterized by having at least 50% of its total pore volume in pores having radii in the size range of 50-100 A. Still another resid hydrodesulfurization process is disclosed in U.S. Pat. No. 3,814,683. In this patent, the conventional HDT catalyst is characterized by having at least 65% of its total pore volume in pores having a diameter size of 80-180 A.

Other hydrodesulfurization processes using a conventional HDT catalyst characterized by a specific pore size distribution are disclosed in U.S. Pat. Nos. 4,032,435; 4,051,021; 4,069,139 and 4,073,718.

Whereas a great amount of attention has been given to hydrotreating petroleum residual fractions, much less emphasis has been placed specifically on highly aromatic petroleum and coal derived liquids. U.S. Pat. No. 3,812,028 describes a process for hydrotreating fossil fuels containing polynuclear aromatics utilizing a catalyst comprising activated carbon and a metallic component. In U.S. Pat. No. 4,051,021, a hydrodesulfurization process using a catalyst with a specified pore size distribution is disclosed. In such hydrodesulfurization process, a hydrocarbon feed is contacted with a conventional HDT catalyst having greater than 50 percent of its total pore volume of absolute diameter ranging from about 70 Angstroms to about 100 Angstroms.

With the ever increasing demands on fossil fuels as a source of energy and the ever decreasing supplies of crude petroleum within the United States the nation must place more emphasis on the use of coal. Yet the people of this country have mandated through their representatives that they do not want the anticipated increased use of coal to degrade their environment. Thus the liquid products derived from such sources as coal, shale oil and tar sands must be upgraded in order to remove possible pollutants before utilization of such liquids.

SUMMARY OF THE INVENTION

In accordance with the present invention, there is now provided a catalyst and a process using said catalyst to upgrade highly aromatic petroleum and coal derived liquids. Such upgrading involves the removal of undesirable heteroatoms, i.e. sulfur, nitrogen and oxygen and a reduction in CCR.

The catalyst of this invention comprises at least one Group VIA metal (Cr, Mo W) or its oxides or sulfides and at least one Group VIII metal or its oxides or sulfides deposited on a porous refractory support, wherein said catalyst has a surface area of between about 100 and 300 m$^2$/g and a total pore volume of between about 0.3 and 1.0 cc/g and is further characterized as follows:

| Pore Volume Distribution, Volume % in Pores of | |
|---|---|
| 0–150 Angstroms diameter | 20–40 |
| 150–200 Angstroms diameter | 40–60 |
| 200 + Angstroms diameter | 10–30 |

The process of this invention involves the contacting of this catalyst with a highly aromatic liquid under specified conditions.

DESCRIPTION OF THE PREFERRED EMBODIMENTS

The feedstocks for this invention are highly aromatic liquids derived from such sources as petroleum, coal, shale oil, tar sands, etc. Particularly suitable feedstocks for the present invention comprise the products of coal liquefaction processes. If coal derived liquids were utilized without upgrading (i.e. removal of undesirable elements), for example in a boiler, the result would be a great increase in air pollution.

The air pollutants of particular concern are nitrogen oxides, sulfur oxides and particulates. Nitrogen oxides are formed from nitrogen in air as well as organic nitrogen in the fuel, and their concentration is primarily a function of combustion parameters. Sulfur oxides and particulates are a function of the chemical composition of the fuel used.

Coal is liquefied by exposing it to hydrogen gas or a hydrogen-bearing solvent under pressure and, in many processes, in the presence of a catalyst. Temperatures are generally kept below 900° F. so that the hydrocarbons are not converted to coke and gaseous products. Alternatively, coal can be destructively distilled by heating in such a way that its volatile components are given off and can then be condensed as a liquid. The net result is an increased hydrogen/carbon ratio in the liquid products. Hydrogen is generated by gasifying a portion of the coal, or of a coal residue in most schemes, and this is a substantial portion of the cost of liquefaction. Sulfur content of the coal is also an important constraint, since hydrogen is also needed to remove this contaminant (as hydrogen sulfide gas), in proportion to the amount of sulfur present. In theory, it is somewhat easier and cheaper to make a heavy oil from coal suitable for a boiler fuel than a synthetic crude oil that can be refined to gasoline, since the crude oil product requires adding about twice as much hydrogen—between 5 and 10 percent of the coal's weight. Boiler fuels may also have an economic advantage in that they would supply a regulated market—the electric utility industry that now generates about 30 percent of its power with oil and natural gas—making commercial introduction somewhat easier.

The three direct general processes for converting coals to liquid fuels are: catalyzed hydrogenation, staged pyrolysis, and solvent refining. Each of these processes results in the production of a coal liquid which contains a variety of desirable and undesirable components. The desirable coal liquids are the oils (saturated and aromatic hydrocarbons) and the resins.

The undesirable species are the asphaltenes and the carbenes (high molecular weight highly aromatic solids) and the carboids (polymerized coke-like materials). The undesirable elements are the metals, sulfur, nitrogen, and oxygen which are generally present in higher concentration in the asphaltene and carboid fractions. Under hydrogenolysis conditions, the conversion of coal to oil has been suggested to proceed via the following sequence: Coal→Asphaltene→Oil. Therefore, asphaltene generation and elimination are of great importance in the liquefaction process.

One example of a typical coal liquefaction process is the Solvent Refined Coal (SRC) process, which is a method of dissolving coal to remove its ash, reduce its sulfur content and lower its average molecular weight. Pulverized coal is mixed with a solvent and hydrogen and heated until most of it dissolves. Gases including hydrogen sulfide are removed, as are ash and other undissolved solids. A fraction of the remaining liquid is recycled as the solvent, and the rest is product, a low-sulfur boiler fuel that is solid at room temperature but melts readily at about 375° F. It is the light organic liquid derived from the Solvent Refined Coal (SRC) process that can be a feedstock for this invention.

Another coal liquefaction process is the H-Coal process. In this process, coal is converted to oil by direct hydrogenation. The sequence of processing steps is essentially the same as in solvent refining except that the mixture of finely ground coal, recycle oil, and hydrogen are reacted in the presence of a catalyst. The process can produce either synthetic crude oil or, by lowering the reaction temperature and adding less hydrogen, a heavy-oil boiler fuel. The Synthoil process is similar to H-Coal in that it is also a catalytic process.

Still another coal liquefaction process is the Donor Solvent process. This process differs from H-Coal in that hydrogenation of the coal is carried out indirectly, through a solvent that transfers hydrogen to the coal while extracting a liquid product.

In comparison with conventional petroleum fuels and residua, coal liquids generally exhibit slightly higher carbon content, but significantly lower hydrogen content. Recent data suggests both a higher degree of aromaticity and a more highly condensed ring structure for coal liquids than for conventional petroleum type liquids.

A more striking difference between the coal liquids and petroleum type liquids is the heteroatom content. Nitrogen and oxygen levels in coal liquids are much higher than in petroleum, but sulfur is somewhat lower. Furthermore, 40–70 wt % of the nitrogen in coal liquids is basic in character compared to 25–30 wt% for typical conventional petroleum stocks.

Highly aromatic petroleum liquids are also suitable feedstocks for this invention. Heavy, aromatic, high sulfur content crudes make up an increasing fraction of today's refinery feeds. This trend towards less desirable refinery feed is very likely to continue in the near future. Furthermore, refinery by-product liquids such as FCC clarified slurry oil can be rendered useful with the proper treatment. Such proper treatment is disclosed in this invention.

The aromaticity of a particular feedstock can be expressed as "% $C_A$". The "% $C_A$" is defined as the percent of carbon atoms which are present in aromatic rings based on the total amount of carbon atoms and is given by the formula:

$$\% \ C_A = \frac{C \ \text{Atoms in Aromatic Rings}}{\text{Total } C \ \text{Atoms}} \times 100\%$$

The % $C_A$ for representative compounds are as follows:

Benzene  %$C_A$ = 100%

Toluene  %$C_A$ = 85.7%

Xylene  %$C_A$ = 75%

Liquid feeds that would be amenable to this invention would have an aromaticity as expressed in % $C_A$ in a range between about 40% and 100% and preferably between about 50% and 100%.

Aromaticity is a function of boiling point. This is clearly shown in Table 1 which gives properties, including % $C_A$, for various petroleum components.

TABLE 1

| | Aromaticity of Petroleum Components | | | | |
|---|---|---|---|---|---|
| | FCC Light Gasoline | FCC Light Cycle Oil | FCC Clarified Slurry Oil | Coker Light Gas Oil | Coker Heavy Gas Oil |
| Gravity, °API | 47.9 | 17.4 | 0.3 | 33.1 | 21.6 |
| Hydrogen, wt % | 12.68 | 9.80 | 7.97 | 12.74 | 11.28 |
| Nitrogen, wt % | 0.031 | 0.25 | 0.41 | 0.30 | 0.76 |
| Aromaticity, % $C_A$ | 36 | 54 | 70 | 23 | 38 |
| Distillation (D-2887), °F. | | | | | |
| 5% | 79 | 398 | 576 | 346 | 469 |
| 50% | 274 | 523 | 727 | 459 | 597 |
| 95% | 404 | 677 | 863 | 543 | 686 |

Table 2 gives aromaticities for various coal liquids and petroleum residua. It can be seen from Table 2 that the % $C_A$ for coal derived liquids ranges from between about 50% and 80%, while the % $C_A$ for petroleum residua ranges from between about 20% and 35%.

The aromatic feedstock of this invention must be further characterized by having a majority of its aromaticity in "polynuclear aromatics." Polynuclear aromatics are aromatic compounds having three or more connected aromatic rings, such as anthracene, phenanthrene, chrysene, etc.

TABLE 2

| AROMATICITIES OF COAL LIQUIDS AND PETROLEUM RESIDUA DETERMINED BY C13 NMR SPECTROSCOPY | | |
|---|---|---|
| | % $C_A$ (Atom %) | C/H (Atom Ratio) |
| SRC type I from Illinois No. 6 Coal | 77 | 1.29 |
| SRC Recycle Solvent | 70 | 0.970 |
| Synthoil from Illinois No. 6 Coal | 61 | 0.922 |
| H-Coal from Illinois | 63 | 0.940 |

TABLE 2-continued

| AROMATICITIES OF COAL LIQUIDS AND PETROLEUM RESIDUA DETERMINED BY C13 NMR SPECTROSCOPY | | |
|---|---|---|
| | % $C_A$ (Atom %) | C/H (Atom Ratio) |
| No. 6 Coal (fuel oil mode) | | |
| Petroleum No. 6 Fuel Oil | 24 | 0.647 |
| Mid-Continent Vacuum Residuum | 19 | 0.600 |
| West Texas Sour Vacuum Residuum | 34 | 0.706 |

Large amounts of sulfur, nitrogen and oxygen (high heteroatom content) decrease the overall efficiency of processing catalysts. Therefore the removal of such contaminants is very important in the production of high quality fuels from the aforesaid feedstocks.

The useful catalyst of this invention comprises a hydrogenation component composited with a refractory base support having a surface area of between about 100 and 300 m²/g and preferably between about 110 and 175 m²/g and a total pore volume of between about 0.3 and about 1.0 cc/g and preferably between about 0.5 and about 0.8 cc/g. The catalyst is further characterized as follows:

| Pore Volume Distribution Volume % in Pores of | Preferred | More Preferred |
|---|---|---|
| 0–150 Angstroms diameter | 20–40 | 25–35 |
| 150–200 Angstroms diameter | 40–60 | 45–55 |
| 200 + Angstroms diameter | 10–30 | 15–25 |

The preferred and commonly used hydrogenation component of the catalyst comprises at least one Group VIII metal or its oxides or sulfides and at least one Group VIA metal (Cr, Mo, W) or its oxides or sulfides. As used throughout the specification and claims, all references to "Group" refer to the Periodic Chart of the Elements, Fisher Scientific Company, Cat. No. 5-702-10, 1978. The Group VIII metals as used herein include iron, cobalt, and nickel, of which cobalt and nickel are particularly preferred; and the Group VI metals include chromium, molybdenum, and tungsten, of which molybdenum and tungsten are particularly preferred. Particularly preferred combinations include cobalt and molybdenum or nickel and molybdenum. The catalyst compositions contain the preferred combinations of metals, computed as oxide and based on total weight of catalyst, in amounts of about 2 wt.% to about 6 wt.% cobalt (cobaltous oxide) or nickel (nickel monoxide) and from about 8 wt.% to about 20 wt.% molybbenum (molybdenum trioxide), the remainder being the refractory support. Compositing the hydrogenation component with the refractory support, preferably an alumina support, may be done by any of the impregnation or other compositing techniques known in the art. The alumina support preferably should contain less than 0.5 wt.% silica.

The use of a catalyst containing either cobalt or nickel with molybdenum depends on the desired results. In some applications, a nickel-molybdenum catalyst is preferred for denitrogenation, deoxygenation, and CCR reduction, while in other applications, a cobalt-molybdenum catalyst is preferred for desulfurization and lower hydrogen consumption.

The hydrogen gas which is used during the process of this invention is circulated at a rate between about 1,000 and 15,000 scf/bbl of feed and preferably between about 3,000 and 8,000 scf/bbl. The hydrogen purity may vary from about 60 to 100 percent. If the hydrogen is recycled, which is customary, it is desirable to provide for bleeding-off a portion of the recycle gas and to add makeup hydrogen in order to maintain the hydrogen purity within the specified range. The recycled gas is usually washed with a chemical absorbent for hydrogen sulfide or otherwise treated in known matter to reduce the hydrogen sulfide content thereof prior to recycling.

A highly aromatic feedstock is contacted with the catalyst of this invention under hydroprocessing conditions comprising a hydrogen pressure of about 1000 to 3000 psig, preferably about 1500 to 2500 psig; a temperature of 650° F. to 850° F., preferably 700° F. to 820° F.; and a liquid hourly space velocity of 0.1 to 3.0, preferably 0.4 to 1.5. To carry out the present invention, almost any catalytic bed can be used, i.e. fixed beds, ebullated bed, etc.

While not wishing to be bound by any particular theory of operability, it is postulated that the utility of this invention's catalyst is produced by having the specified percent of its pore volume in pores with diameters of 150 to 200 Angstroms. It is believed that the use of conventional HDT catalysts employed for resids will not be able to efficiently remove impurities of highly aromatic liquids due to the much bigger molecules in said aromatic liquids.

The catalysts of this invention also are superior to conventional catalysts for upgrading aromatic liquids in that there is generally less hydrogen consumption during the upgrading process (i.e. sulfur, nitrogen, oxygen removal and CCR reduction).

The following examples will serve to illustrate the invention without limiting same.

EXAMPLE 1

Alumina powder (Kaiser SA Medium) was heated in a muffle furnace to 1700° F. at about 10° F. per minute and held at 1700° F. for 15 minutes.

Three hundred grams of the above calcined alumina powder and 852 grams of uncalcined Kaiser SA-Medium alumina (29.4 LOI) were blended in a muller-mixer, and then 940 ml water were mixed into the mixture. The mixture was then auger-extruded into 1/16 inch diameter cylinders. The extrudate was dried overnight at 250° F., and calcined with air flowing up through the bed of extrudate for four hours at 1000° F., and then calcined further for four hours at 1500° F. This calcined extrudate had the following properties:

Surface area, $m^2/g$ —153
Real density, g/cc—3.44
Particle density, g/cc—0.88
Pore volume, cc/g—0.845
Avg. pore diameter, Angstroms—22'

| Pore Volume Distribution, Volume % in Pores of | |
|---|---|
| 0–30 Angstroms diameter | 10 |
| 30–50 Angstroms diameter | 1 |
| 50–80 Angstroms diameter | 4 |
| 80–100 Angstroms diameter | 8 |
| 100–150 Angstroms diameter | 49 |
| 150–200 Angstroms diameter | 16 |
| 200–300 Angstroms diameter | 4 |
| 300 + Angstroms diameter | 8 |

EXAMPLE 2

The catalyst, that is identified as Catalyst A, was prepared by impregnating 150 grams of the calcined extrudate from Example 1 with 123 ml of solution that contained 28.7 grams ammonium heptamolybdate tetrahydrate $(NH_4)_6Mo_7O_{24}.4H_2O$ (81.5% $MoO_3$). The impregnated extrudate was dried overnight at 250° F. The dried extrudate was then impregnated with 111 ml of solution that contained 20.0 grams of cobaltous chloride crystal, $CoCl_2.6H_2O$, and then dried overnight at 250° F. The dried product was calcined for ten hours at 1000° F. The product catalyst was identified as Catalyst A and its properties are given in Table 3.

EXAMPLE 3

The catalyst, that is identified as Catalyst B, was prepared by impregnating 39.3 grams of the calcined extrudate of Example 1 with 32 ml of solution containing 7.5 grams of ammonium heptamolybdate tetrahydrate (81.5% $MoO_3$). The impregnated extrudate was dried overnight at 250° F. The dried product was then impregnated with 32 ml of solution that contained 5.2 grams of nickelous chloride crystal $NiCl_2.6H_2O$ and dried overnight at 250° F. The product was calcined for 10 hours at 1000° F. The product catalyst, identified as Catalyst B has its properties given in Table 3.

EXAMPLE 4

In this example, two catalysts were compared for their sulfur removal abilities. Catalysts representative of the catalyst of the invention and prepared according to Examples 2 and 3 were compared with a conventional commercial catalyst. The properties of these catalysts are given in Table 3.

The operating conditions for this example included a pressure of about 2000 psig, a temperature range of about 760° F. to 785° F. and a liquid hourly space velocity of about 0.2 to 2.0.

TABLE 3

| | Catalyst Properties | | |
|---|---|---|---|
| | Catalyst A | Catalyst B | Conventional Commercial Catlayst |
| Composition, Wt. % | | | |
| NiO | 0 | 3.5 | 2.7 |
| CoO | 3.5 | 0 | 0 |

TABLE 3-continued

|  | | | |
|---|---|---|---|
| MoO₃ | 13.0 | 13.0 | 14.8 |
| Al₂O₃ | balance | balance | balance |
| Physical Properties | | | |
| Surface Area, m²/g | 134 | 127 | 140 |
| Total Pore Volume, cc/g | 0.659 | 0.685 | 0.602 |
| Average Pore Diameter, Angstroms | 197 | 215 | 172 |
| Packed Density g/cc | 0.63 | 0.64 | — |
| Particle Density, g/cc | 1.06 | 1.04 | 1.14 |
| Real Density, g/cc | 3.50 | 3.64 | 3.60 |

| Pore Volume Distribution | Catalyst A | | Catalyst B | | Conventional Commercial Catalyst | |
|---|---|---|---|---|---|---|
| Pore Diameter, Angstroms | cc/g | % of Total Pore Volume | cc/g | % of Total Pore Volume | cc/g | % of Total Pore Volume |
| 0–30 | 0.026 | 4 | 0.052 | 8 | 0.026 | 5 |
| 30–50 | 0.006 | 1 | 0.011 | 2 | 0.014 | 2 |
| 50–80 | 0.013 | 2 | 0.008 | 1 | 0.023 | 4 |
| 80–100 | 0.013 | 2 | 0.017 | 2 | 0.036 | 6 |
| 100–150 | 0.158 | 24 | 0.132 | 19 | 0.332 | 55 |
| 150–200 | 0.323 | 49 | 0.344 | 50 | 0.132 | 22 |
| 200–300 | 0.059 | 9 | 0.076 | 11 | 0.024 | 4 |
| 300+ | 0.059 | 9 | 0.045 | 7 | 0.014 | 22 |

The feed for this example was FCC Clarified Slurry Oil with the following properties:
  Gravity, API—1.3
  Hydrogen, Wt.%—7.93
  Sulfur, Wt.%—0.96
  Nitrogen, Wt.%—0.40
  CCR, Wt.%—8.68

The two catalysts compared in this example had about the same surface areas and pore volumes. However, the catalyst representative of the invention (Catalyst A) had about 50% of its volume in the 150 to 200 Angstrom pore diameter range, while the conventional commercial catalyst had most of its volume in the 100 to 150 Angstrom pore diameter range. These catalysts were evaluated in a fixed bed reactor with the removal of heteroatoms in the gas phase and the resultant product exiting in the liquid phase. The results of this example are given in Table 4 (Evaluation of Catalyst A) and Table 5 (Evaluation of Conventional Commercial Catalyst). A comparison of these two catalysts for sulfur removal activity based on the data in Tables 4 and 5 is given in FIG. 1.

Figure 1:
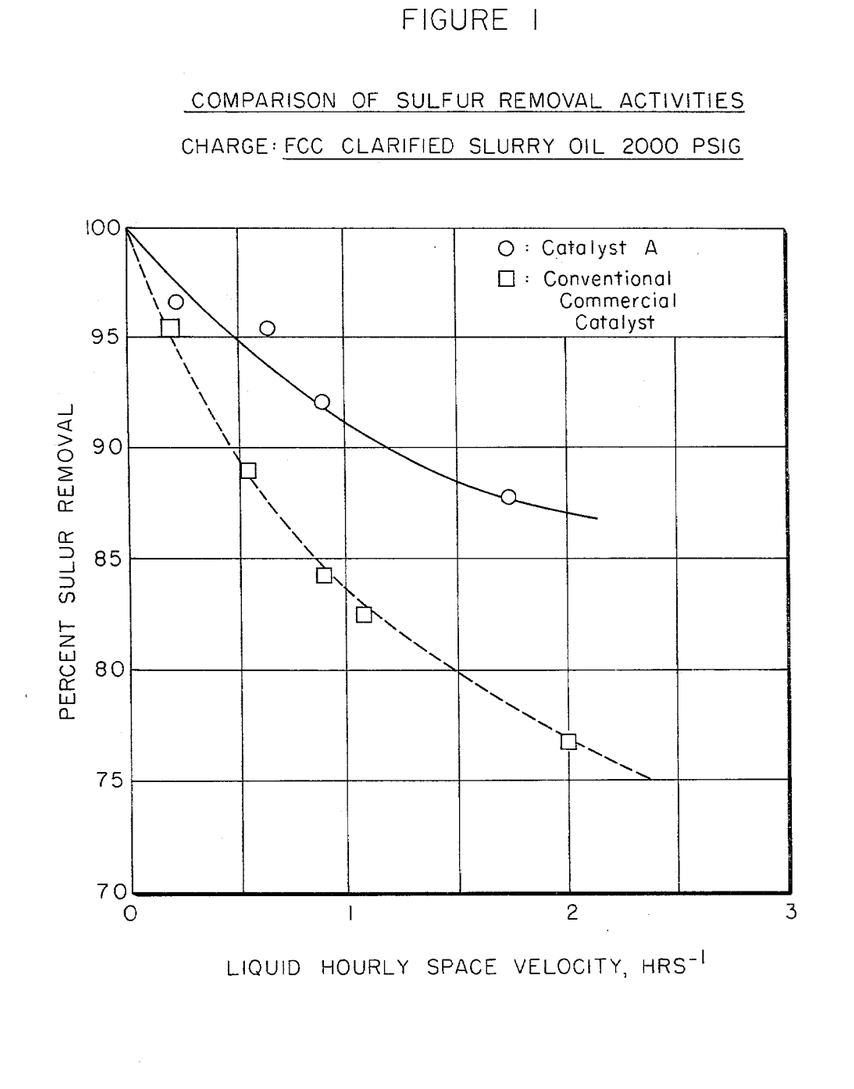
FIG. 1 is a comparison of sulfur removal activities for two catalysts wherein the feedstock is Fluid Catalytic Cracking (FCC) clarified slurry oil. One catalyst represents the catalyst of this invention and it is compared against a conventional commercial catalyst.

Catalyst A which represents the catalyst of this invention shows significantly more activity for desulfurization than the conventional commercial catalyst. For desulfurization, this preference for major pores in the 150 to 200 Angstrom pore diameter range is totally unanticipated.

TABLE 4
CATALYST EVALUATION - CATALYST A
CHARGE: FCC CLARIFIED SLURRY OIL

| OPERATING CONDITIONS | | | | | |
|---|---|---|---|---|---|
| Pressure, psig | 2000 | 1990 | 2000 | 2000 | 2000 |
| Avg. Reactor Temp., °F. | 778 | 769 | 770 | 775 | 775 |
| LHSV V/HR/V | 0.24 | 1.72 | 0.62 | 0.89 | 0.92 |
| H₂ circulation, scf/bbl | 6389 | 4982 | 6283 | 5267 | 6147 |
| TOTAL LIQUID PRODUCT PROPERTIES | | | | | |
| Gravity, API | 7.20 | 11.90 | 4.50 | 8.70 | 3.40 |
| Hydrogen, Wt. % | 9.83 | 11.75 | 9.14 | 9.53 | 9.01 |
| Sulfur, Wt. % | 0.053 | 0.034 | 0.14 | 0.046 | 0.16 |
| Nitrogen, Wt. % | 0.25 | 0.170 | 0.34 | 0.26 | 0.34 |
| CCR, Wt. % | 5.0 | 3.8 | 6.0 | 4.5 | 6.0 |
| HETEROATOM REMOVAL | | | | | |
| Desulfurization, Wt. % | 94.5 | 96.4 | 85.7 | 95.3 | 84.0 |
| Denitrogenation, Wt. % | 38.1 | 57.4 | 15.8 | 36.1 | 15.9 |
| CCR Removal, Wt. % | 43.2 | 55.7 | 31.2 | 49.2 | 32.4 |

TABLE 5
CATALYST EVALUATION - CONVENTIONAL COMMERCIAL CATALYST CHARGE: FCC CLARIFIED SLURRY OIL

| OPERATING CONDITIONS | | | | | |
|---|---|---|---|---|---|
| Pressure, psig | 2000 | 2000 | 2000 | 2000 | 2000 |
| Avg. Reactor Temp., °F. | 783 | 763 | 777 | 776 | 776 |
| LHSV, V/HR/V | 1.07 | 0.19 | 2.03 | 0.52 | 0.92 |
| H₂ circulation, scf/bbl | 5455 | 6605 | 4319 | 5253 | 7262 |
| TOTAL LIQUID PRODUCT PROPERTIES | | | | | |
| Gravity, API | 8.5 | 13.6 | 5.6 | 9.1 | 7.1 |
| Hydrogen, Wt. % | 9.69 | 10.50 | 9.33 | 9.83 | 9.43 |
| Sulfur, Wt. % | 0.18 | 0.044 | 0.23 | 0.11 | 0.15 |
| Nitrogen, Wt. % | 0.18 | 0.06 | 0.30 | 0.18 | 0.25 |
| CCR, Wt. % | 4.8 | 3.1 | 6.0 | 4.2 | 5.2 |
| HETEROATOM REMOVAL | | | | | |
| Desulfurization, Wt. % | 81.8 | 95.7 | 76.4 | 89.0 | 84.9 |
| Denitrogenation, Wt. % | 55.4 | 85.9 | 25.3 | 55.9 | 38.3 |
| CCR Removal, Wt. % | 46.0 | 63.2 | 30.9 | 52.2 | 39.0 |

EXAMPLE 5

This example illustrates the high activity of the catalyst of the invention for sulfur, nitrogen and oxygen removal from a coal derived liquid. The catalysts utilized were prepared according to Examples 2 and 3 and their activity was compared with a conventional commercial catalyst. Catalyst properties are given in Table 3.

Table 6 gives the results obtained from hydrotreating H-Coal liquid in a Shaker Bomb reactor at a pressure of 1200 psig, a temperature of 700° F., for a period of two hours and with 10 wt. oil/catalyst. The properties of the H-Coal liquid used are as follows:
   Sulfur Content—0.24 wt.%
   Nitrogen Content—0.64 wt.%
   Oxygen Content—1.34 wt.%

All three catalysts compared in this example had about the same surface areas and pore volumes as shown in Table 3. The two catalysts representative of this invention, namely Catalyst A and Catalyst B, had about 50% of their volume in 150 to 200 Angstrom pore diameter range. The conventional commercial catalyst, compared with these two catalysts, had most of its pores in the 100 to 150 Angstrom pore diameter range. Both Catalyst A and Catalyst B were prepared on the same alumina support, however, Catalyst B was a Ni/Mo catalyst while Catalyst A was a Co/Mo catalyst.

Both Catalyst A and Catalyst B exhibited greater activity for sulfur and oxygen removal than did the conventional commercial catalyst. Catalyst B showed greater activity for nitrogen removal than the conventional commercial catalyst.

TABLE 6
HYDROTREATING H-COAL LIQUID

| % Removal | Catalyst A | Catalyst B | Conventional Commercial Catalyst |
|---|---|---|---|
| Sulfur | 98 | 97 | 93 |
| Nitrogen | 30 | 36 | 31 |
| Oxygen | 58 | 59 | 54 |

EXAMPLE 6

In this example, another coal derived liquid, namely SRC derived liquid, was evaluated using a catalyst representative of this invention. The catalyst representative of this invention was prepared according to Example 3 and it was compared with a conventional commercial catalyst. Catalyst properties are given in Table 3.

The operating conditions for this example included a pressure of about 2000 psig, a temperature range of about 725° F. to 810° F. and a liquid hourly space velocity of about 0.2 to 2.0.

The feed for this example was 50% West Kentucky SCT (Short Contact Time), SRC. The remaining 50% of the feed was a diluent to increase the fluidity of the charge stock, namely recycle solvent in the SRC process characterized by a 475° F. to 850° F. cut. This recycle solvent is commonly used in the SRC process to slurry the coal feed.

The charge stock properties are as follows:
   Gravity, API—8.0
   Hydrogen, Wt.%—6.4
   Sulfur, Wt.%—0.7
   Nitrogen, Wt.%—1.40
   Oxygen, Wt.%—4.45
   CCR, Wt.%—24.6

The catalyst was evaluated in a fixed bed reactor with the removal of heteroatoms in the gas phase and the resultant product exiting in the liquid phase. The results for this example are given in Tables 7 and 8 and in FIGS. 2, 3, 4 and 5.

In FIGS. 2, 3, 4 and 5 both the pressure (2000 psig) and space velocity (0.5 LHSV) were kept constant throughout.

Figure 2:
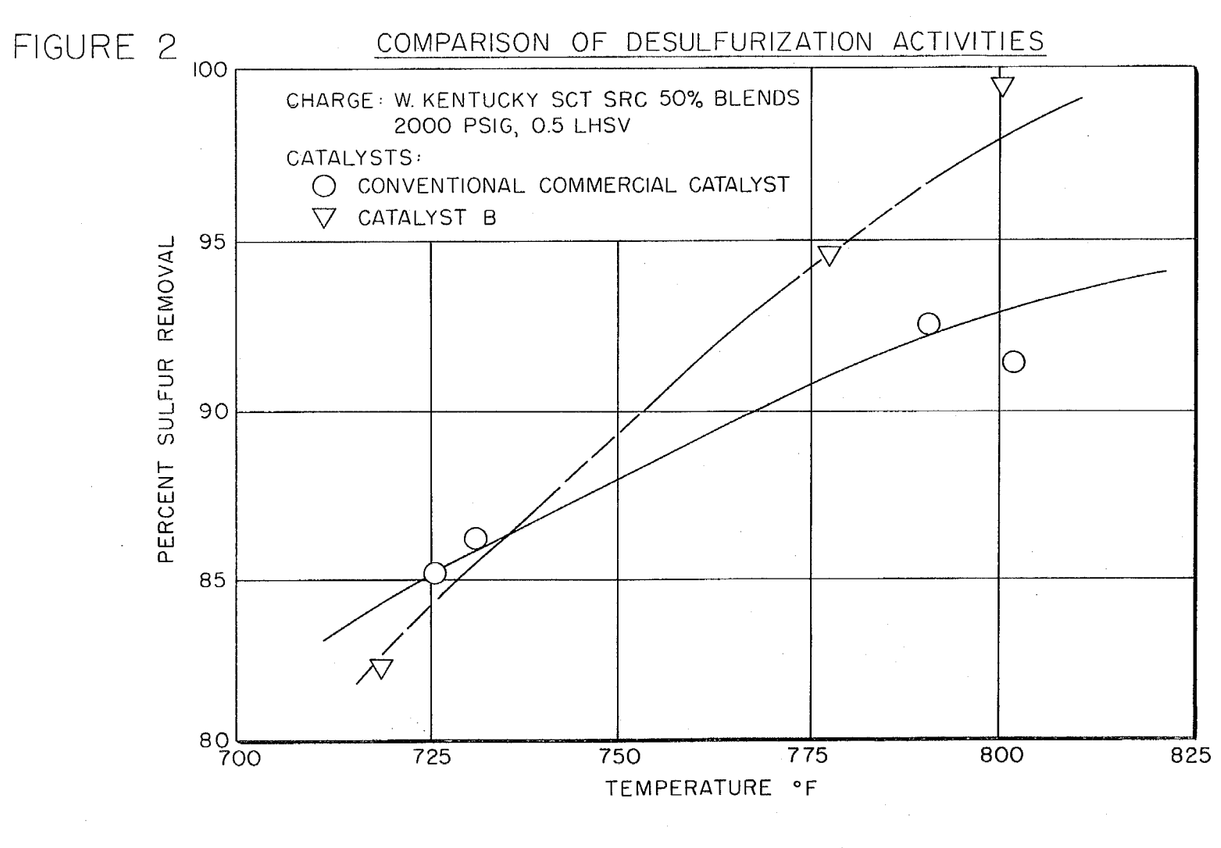
FIG. 2 is a comparison of sulfur removal activities for two catalysts wherein the feedstock is West Kentucky SCT SRC 50% blend. One catalyst represents the catalyst of this invention and it is compared against a conventional commercial catalyst.
Figure 3:
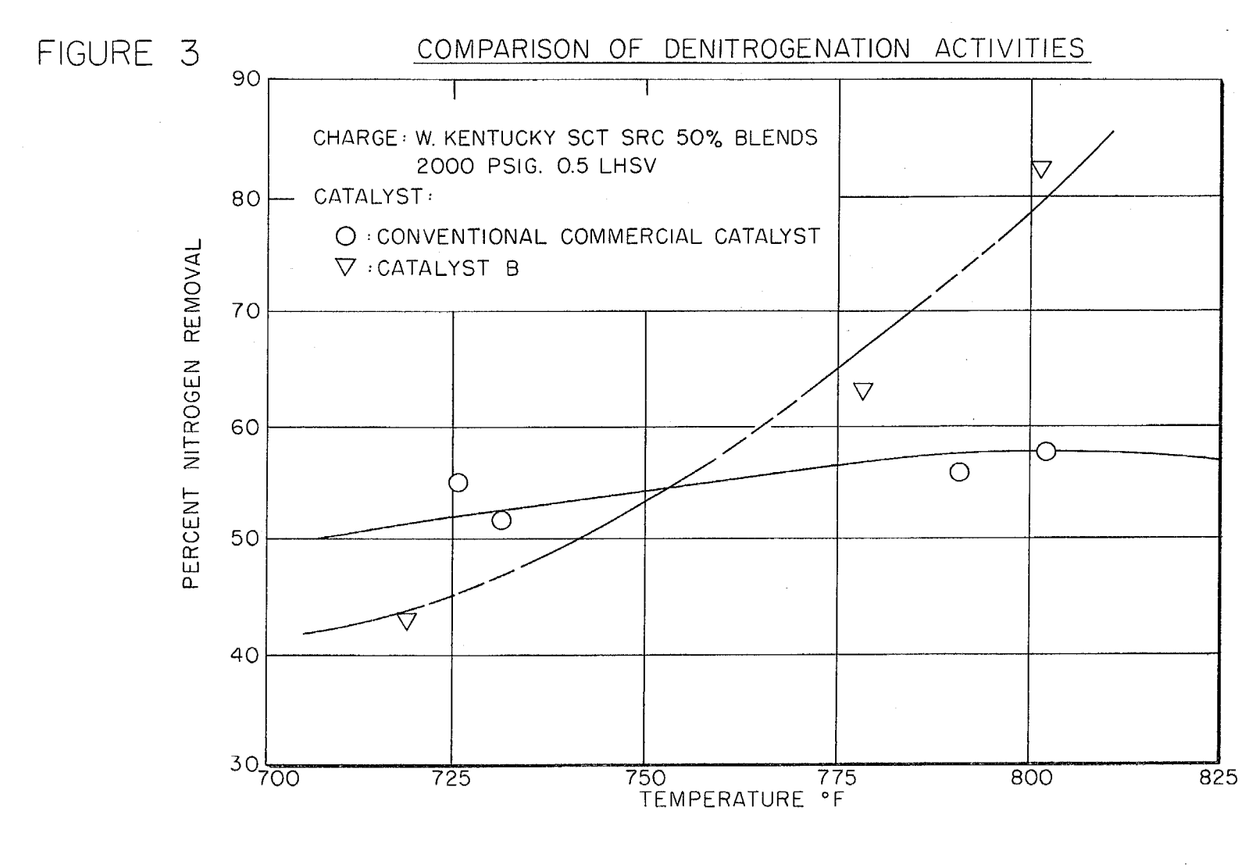
FIG. 3 is a comparison of nitrogen removal activities for the same catalysts and feedstock as used in FIG. 2.
Figure 4:
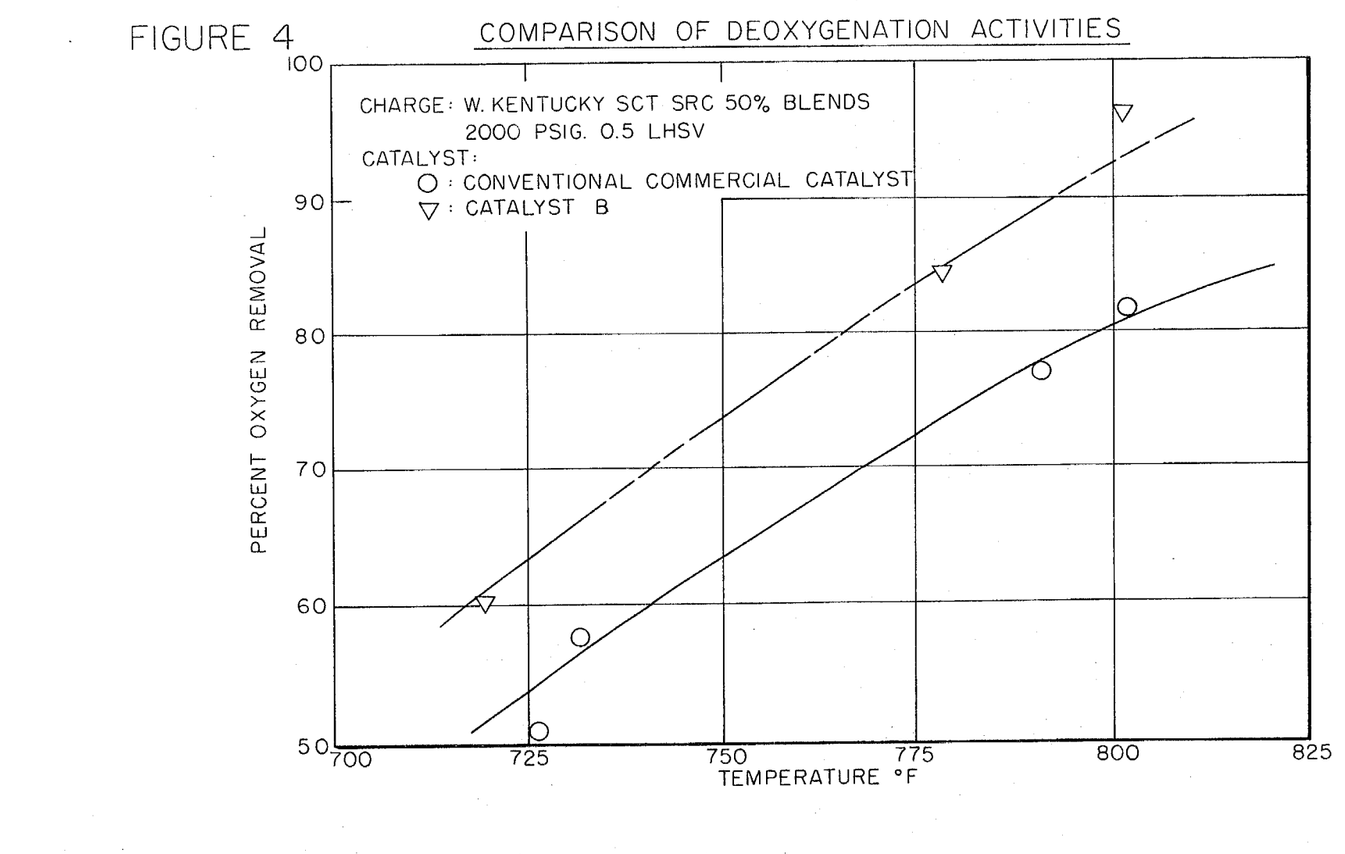
FIG. 4 is a comparison of oxygen removal activities for the same catalysts and feedstock as used in FIG. 2.
Figure 5:
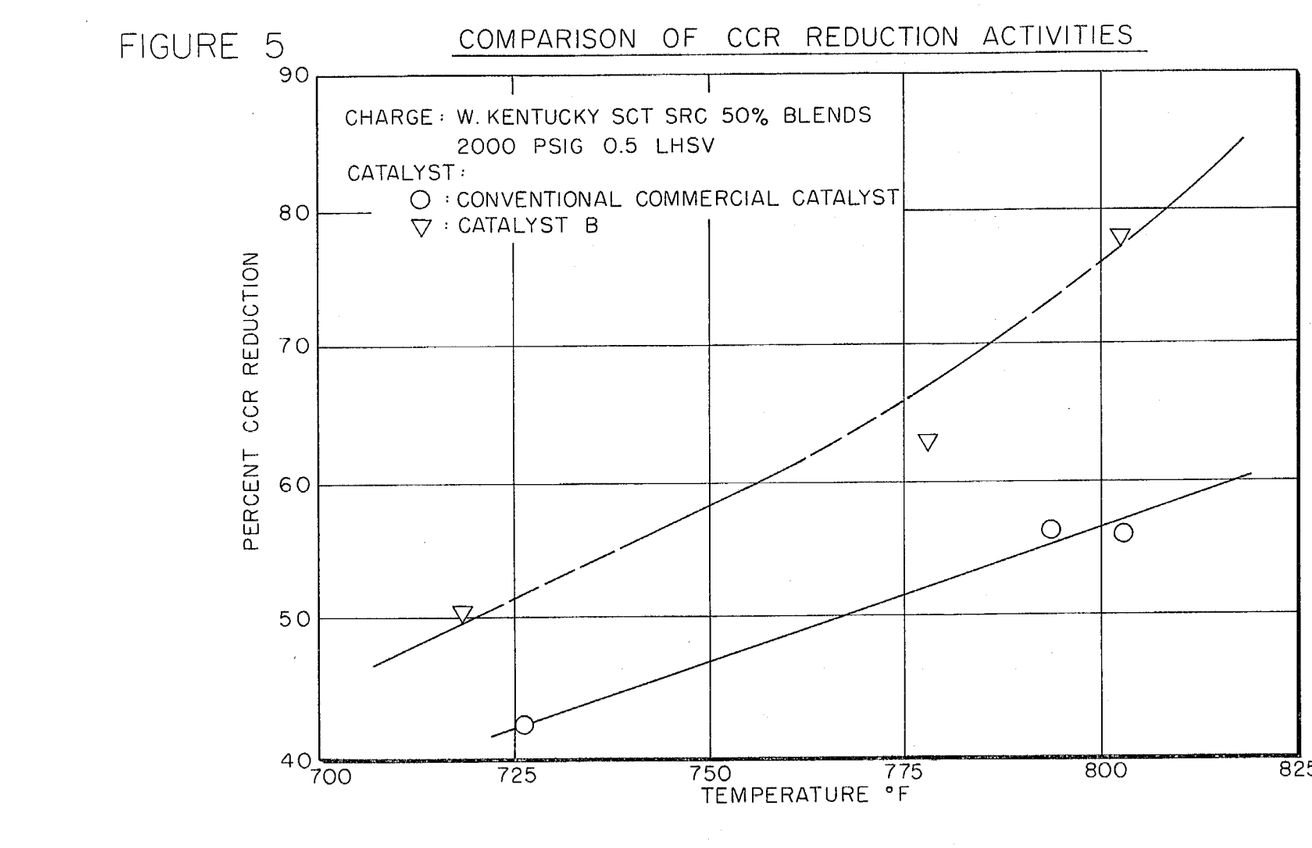
FIG. 5 is a comparison of CCR reduction activities for the same catalysts and feedstock as used in FIG. 2.

FIG. 2 demonstrates the superior sulfur removal activity of a catalyst representative of this invention as compared to a conventional commercial catalyst. FIG. 3 compares the nitrogen removal activities of a catalyst representative of the present invention and a conventional commercial catalyst. It is shown in FIG. 3 that the catalyst of this invention generally provides better results for denitrogenation than the conventional commercial catalyst it was compared to. In FIG. 4, the superior oxygen removal activity of the catalyst representative of this invention is clearly demonstrated. FIG. 5 is a comparison of CCR reduction activities. As is shown by FIG. 5, the catalyst of this invention provides better CCR reduction than the conventional commercial catalyst it was compared with.

TABLE 7
CATALYST EVALUATION - CATALYST B
CHARGE: 50/50
WEST KENTUCKY SCT SRC/RECYCLE SOLVENT

| OPERATING CONDITIONS | | | |
|---|---|---|---|
| Pressure, psig | 1970 | 1975 | 1975 |
| Av. Reactor Temp., °F. | 7.9 | 779 | 807 |
| LHSV, V/HR/V | 0.64 | 0.51 | 0.73 |
| H$_2$ circulation, scf/bbl | 6683 | 9365 | 10678 |
| TOTAL LIQUID PRODUCT PROPERTIES | | | |
| Gravity, API | 1.9 | 7.6 | 6.0 |
| Hydrogen, Wt. % | 8.46 | 9.32 | 8.90 |
| Sulfur, Wt. % | 0.14 | 0.04 | 0.10 |
| Nitrogen, Wt. % | 0.97 | 0.60 | 0.59 |
| Oxygen, Wt. % | 2.02 | 0.75 | 0.57 |
| CCR, Wt. % | 14.32 | 9.68 | 9.16 |
| HETEROATOM REMOVAL | | | |
| Desulfurization, Wt. % | 79.9 | 94.3 | 86.6 |
| Denitrogenation, Wt. % | 38.7 | 62.5 | 64.0 |
| Deoxygenation, Wt. % | 56.2 | 83.9 | 88.0 |
| CCR Removal, Wt. % | 44.6 | 62.9 | 65.8 |

TABLE 8
CATALYST EVALUATION:
CONVENTIONAL COMMERCIAL CATALYST
CHARGE: 50/50
WEST KENTUCKY SCT SCR/RECYCLE SOLVENT

| OPERATING CONDITIONS | | | | | |
|---|---|---|---|---|---|
| Pressure, psig | 2000 | 2000 | 2000 | 2000 | 2000 |
| Avg. Reactor Temp., °C. | 726 | 725 | 802 | 732 | 791 |
| LHSV, V/HR/V | 0.59 | 0.68 | 0.65 | 0.58 | 0.50 |
| H$_2$ circulation, scf/bbl | 6760 | 8112 | 6070 | 7627 | 5388 |
| TOTAL LIQUID PRODUCT PROPERTIES | | | | | |
| Gravity, API | 8.6 | 0.6 | 5.0 | 9.5 | 9.6 |
| Hydrogen, Wt. % | 8.61 | 8.04 | 8.65 | 8.46 | 9.14 |
| Sulfur, Wt. % | 0.11 | 0.19 | 0.08 | 0.13 | 0.07 |
| Nitrogen, Wt. % | 0.70 | 1.04 | 0.74 | 0.75 | 0.66 |
| Oxygen, Wt. % | 2.3 | 2.4 | 1.0 | 1.9 | 3.1 |
| CCR, Wt. % | 8.0 | 17.6 | 13.4 | 10.7 | 12.2 |
| HETEROATOM REMOVAL | | | | | |
| Desulfurization, Wt. % | 83.8 | 71.7 | 87.7 | 84.9 | 92.1 |
| Denitrogenation, Wt. % | 52.1 | 28.3 | 53.2 | 49.1 | 55.5 |
| Deoxygenation, Wt. % | 48.0 | 45.3 | 79.1 | 55.4 | 27.7 |
| CCR Removal, Wt. % | 68.6 | 29.8 | 50.9 | 61.7 | 56.2 |

What is claimed is:

1. A catalyst for the upgrading of a highly aromatic petroleum or coal derived liquid comprising at least one Group VIII metal or its oxides or sulfides and at least one additional member selected from the group consisting of chromium, molybdenum, tungsten, oxides thereof and sulfides thereof on a refractory support, said catalyst having a surface area of between about 110 and about 175 m²/g and a total pore volume of between about 0.5 and about 0.8 cc/g and being further characterized as follows:

| Pore Volume Distribution, Volume % in Pores of | |
| --- | --- |
| 0–150 Angstroms diameter | 25–35 |
| 150–200 Angstroms diameter | 45–55 |
| 200+ Angstroms diameter | 10–30 |

2. The catalyst of claim 1 wherein said catalyst is further characterized by having a pore volume distribution in pores of 200 Angstroms or larger diameter in the range of from 15 volume percent to 25 volume percent.

3. The catalyst of claim 1 wherein the refractory support is alumina.

4. The catalyst of claim 1 wherein the additional member is molybdenum.

5. The catalyst of claim 1 wherein the Group VIII metal is cobalt.

6. The catalyst of claim 1 wherein the Group VIII metal is nickel.

7. The catalyst of claim 1 wherein the additional member is molybdenum and the Group VIII metal is cobalt.

8. The catalyst of claim 1 wherein the additional member is molybdenum and the Group VIII metal is nickel.

9. The catalyst of claim 1 wherein the additional member is molybdenum and the Group VIII metals are cobalt and nickel.

10. The catalyst of claim 1 wherein the oxide or sulfide of the Group VIII metal is about 2 wt. % to 6 wt. %, the oxide or sulfide of the additional member is about 8 wt. % to 20 wt. % and the remainder is the refractory support.

* * * * *

UNITED STATES PATENT AND TRADEMARK OFFICE
CERTIFICATE OF CORRECTION

PATENT NO. : 4,357,263

DATED : November 2, 1982

INVENTOR(S) : Roland H. Heck, Stephen M. Oleck and Stuart S. Shih

It is certified that error appears in the above—identified patent and that said Letters Patent is hereby corrected as shown below:

On the title page

In the listing of inventors, change "Stephen M. Cleck" to --Stephen M. Oleck--.

Col. 8, line 10 Change, "22'" to read --221--.

Col. 9, Table 4, line 7, "0.92" should be in the first column, "0.24" should be in the second column, "1.72" should be in the third column, "0.62" should be in the fourth column, and "0.89" should be in the fifth column.

Col. 12, Table 7 line 26, Change "7.9" to read --719--.

Signed and Sealed this

Twenty-sixth Day of April 1983

[SEAL]

Attest:

GERALD J. MOSSINGHOFF

Attesting Officer   Commissioner of Patents and Trademarks